(12) United States Patent  (10) Patent No.: US 7,412,160 B2
Nakanishi et al.  (45) Date of Patent: Aug. 12, 2008

(54) IMAGE PICKUP APPARATUS AND LENS BARREL

(75) Inventors: Kenichi Nakanishi, Saitama (JP); Ken Tanaka, Tokyo (JP); Takumi Fukuda, Tokyo (JP)

(73) Assignee: Sony Corporation (JP)

( * ) Notice: Subject to any disclaimer, the term of this patent is extended or adjusted under 35 U.S.C. 154(b) by 443 days.

(21) Appl. No.: 11/324,469

(22) Filed: Jan. 4, 2006

(65) Prior Publication Data

US 2006/0164515 A1 Jul. 27, 2006

(30) Foreign Application Priority Data

Jan. 26, 2005 (JP) ............................. 2005-018267

(51) Int. Cl.
*G03B 13/32* (2006.01)
(52) U.S. Cl. ............................. 396/133; 396/79; 396/85; 359/824
(58) Field of Classification Search ................... 396/85, 396/79, 133; 348/207, 375, 207.99; 359/824, 359/362
See application file for complete search history.

(56) References Cited

U.S. PATENT DOCUMENTS 5,471,100 A * 11/1995 Sakamoto et al. ............. 310/12
5,572,372 A * 11/1996 Sekine et al. ................ 359/824
5,905,598 A * 5/1999 Shimada et al. ............. 359/694
5,956,529 A * 9/1999 Lee et al. ....................... 396/55
6,324,023 B1 * 11/2001 Nagaoka et al. ............. 359/824
7,215,490 B2 * 5/2007 Chao .......................... 359/704
2005/0111112 A1 * 5/2005 Masuda ....................... 359/696

FOREIGN PATENT DOCUMENTS

JP 2000-147350 5/2000

* cited by examiner

*Primary Examiner*—Patrick Assouad
*Assistant Examiner*—Linda B Smith
(74) *Attorney, Agent, or Firm*—Rader Fishman & Grauer PLLC; Ronald P. Kananen

(57) ABSTRACT

An image pickup apparatus includes a lens barrel, a lens holding frame made movable in an optical axis direction inside the lens barrel, a movable lens held in the lens holding frame, a yoke inserted into the lens barrel and attached to the lens barrel, a magnet attached to the yoke, and a driving coil that is attached to the lens holding frame and located to be opposed to the magnet and gives propulsion to the lens holding frame. A pair of first fitting sections is provided in the lens barrel. A pair of second fitting sections is provided in the lens barrel. An interval between the first fitting sections is set larger than an interval between the second fitting sections. A distance from the optical axis to the respective first fitting sections is set larger than a distance from the optical axis to the respective second fitting sections.

7 Claims, 10 Drawing Sheets

IMAGE PICKUP APPARATUS AND LENS BARREL

CROSS-REFERENCES TO RELATED APPLICATIONS

This application contains subject matter related to Japanese Patent Application JP 2005-018267 filed in the Japanese Patent Office on Jan. 26, 2005, the entire contents of which are incorporated herein by reference.

BACKGROUND OF THE INVENTION

1. Field of the Invention

The present invention relates to a technical field concerning an image pickup apparatus and a lens barrel. More specifically, the invention relates to a technique for contriving a formation position of a fitting section to which a yoke is attached in a fitted state and realizing prevention of backlash in the state of attachment of the yoke to a lens barrel, facilitation of manufacturing of the lens barrel, and the like.

2. Description of the Related Art

Among image pickup apparatuses, such as a still camera and a video camera, there is an image pickup apparatus that has a movable lens for zooming or focusing in a lens barrel. In the image pickup apparatus, the movable lens is held in a lens holding frame made movable in an optical axis direction.

In such an image pickup apparatus, a moving mechanism for moving the lens holding frame in the optical axis direction is provided (see, for example, JP-A-2000-147350).

The moving mechanism is arranged inside the lens barrel and includes, for example, a yoke attached to the lens barrel, a magnet attached to the yoke, and a driving coil attached to the lens holding frame and located to be opposed to the magnet at least in a part thereof. The yoke is arranged in a state in which the yoke is inserted in the driving coil. The yoke is formed long in the optical axis direction according to the movement range in the optical axis direction of the lens holding frame.

In such a moving mechanism, when a driving current is supplied to the driving coil, in a relation between a direction of the current supplied and a magnetic pole of a magnet, propulsion corresponding to the energization direction is given to the lens holding frame. The movable lens is moved in the optical axis direction following a movement of the lens holding frame.

SUMMARY OF THE INVENTION

As the image pickup apparatus including the moving mechanism described above, there is an image pickup apparatus in which the yoke is inserted into an internal space of the lens barrel from an insertion opening formed at one end in the optical axis direction and attached to the inside of the lens barrel in a fitted state.

The lens barrel of such an image pickup apparatus is formed by injection molding. The internal space and the insertion opening are formed in the lens barrel by pulling out a mold in one direction to release the mold after injection cooling of resin.

In the lens barrel in the past, a pair of fitting sections are provided so as to be spaced apart in a direction orthogonal to both a longitudinal direction and a thickness direction of the yoke. A predetermined portion of the yoke is fitted in the pair of fitting sections to attach the yoke to the lens barrel in a fitted state.

However, when the yoke is fitted in the pair of fitting sections and attached to the lens barrel, backlash of the yoke with respect to the lens barrel is more likely to occur as the length of the yoke increases. As a result, movement of the lens holding frame is hindered. In particular, when the movable lens is used as a zooming lens, in general, since a moving distance in the optical axis direction is long compared with the case in which the movable lens is used as a focusing lens, it may be necessary to increase the length of the yoke. As a result, a larger backlash occurs.

When backlash of the yoke easily occurs, the yoke has a low impact resistance. For example, depending on the magnitude of impact on the image pickup apparatus, the yoke drops from the lens barrel or noise is caused by a backlash.

Thus, as a method of attaching a long yoke, as disclosed in JP-A-2000-147350, there is a structure in which a notch hole opened in a direction orthogonal to an optical axis direction of a lens barrel is formed to insert the yoke from the notch hole and fix and hold the yoke.

However, in the structure in which the yoke is inserted from the notch hole formed in the lens barrel so as to be fixed and held, the notch hole is formed in the lens barrel in addition to the insertion opening, and the opening area of the lens barrel increases. Thus, dust easily enters the inside of the lens barrel.

There is also a structure in which a yoke is fixed and held in two places in a longitudinal direction of the yoke by two lens barrels, as disclosed in JP-A-2004-12745.

However, when the yoke is held by the two lens barrels, in the type of an optical apparatus that performs tilt adjustment by moving one lens barrel relatively to the other lens barrel from the viewpoint of securing satisfactory optical performance, the tilt operation is hindered.

On the other hand, when the lens barrel is formed by pulling out the mold in one direction and releasing the mold, it may be necessary to realize an improvement of mold release characteristics.

Thus, it is desirable to overcome the problems described above and realize prevention of backlash in a state of attachment of a yoke to a lens barrel, facilitation of manufacturing of the lens barrel, and the like.

According to an embodiment of the invention, there is provided an image pickup apparatus that includes a lens barrel, a lens holding frame made movable in an optical axis direction inside the lens barrel, a movable lens held in the lens holding frame, a yoke inserted into the lens barrel from one side in the optical axis direction and attached to the lens barrel in a fitted state, a magnet attached to the yoke, and a driving coil that is attached to the lens holding frame and located to be opposed to the magnet at least in a part thereof and gives propulsion in a direction corresponding to a direction of a supplied driving current to the lens holding frame. A pair of first fitting sections that are spaced apart in the optical axis direction and a direction orthogonal to a thickness direction of the yoke and fit the yoke therein is provided in the lens barrel. A pair of second fitting sections that are spaced apart in the optical axis direction and the direction orthogonal to the thickness direction of the yoke and fit the yoke therein is provided in the lens barrel further on a side of a direction of insertion of the yoke into the lens barrel than the first fitting sections. An interval between the first fitting sections is set larger than an interval between the second fitting sections. A distance from the optical axis to the respective first fitting sections is set larger than a distance from the optical axis to the respective second fitting sections.

According to another embodiment of the invention, there is provided a lens barrel that includes a pair of first fitting sections that are spaced apart in an optical axis direction and a direction orthogonal to a thickness direction of a yoke and fit the yoke therein and a pair of second fitting sections that are spaced apart in the optical axis direction and the direction orthogonal to the thickness direction of the yoke and fit the yoke therein further on a side of the direction of insertion of the yoke into the lens barrel than the first fitting sections. An interval between the first fitting sections is set larger than an interval between the second fitting sections. A distance from the optical axis to the respective first fitting sections is set larger than a distance from the optical axis to the respective second fitting sections.

Therefore, in the image pickup apparatus and the lens barrel, the yoke is attached to the lens barrel in a fitted state by the pair of first fitting sections and the pair of second fitting sections that are provided to be spaced apart in the optical axis direction, respectively.

DESCRIPTION OF THE PREFERRED EMBODIMENTS

An embodiment of the present invention will be hereinafter explained in detail with reference to the accompanying drawings.

An image pickup apparatus according to the embodiment is applied to a video camera, and a lens barrel according to the embodiment is applied to a lens barrel used in the video camera. The range of application of the invention is not limited to the video camera and the lens barrel used in the video camera. The invention may be applied to, other than the video camera, various image pickup apparatuses having the functions of moving image photographing and still image photographing and various lens barrels used in the image pickup apparatuses.

Figure 1:
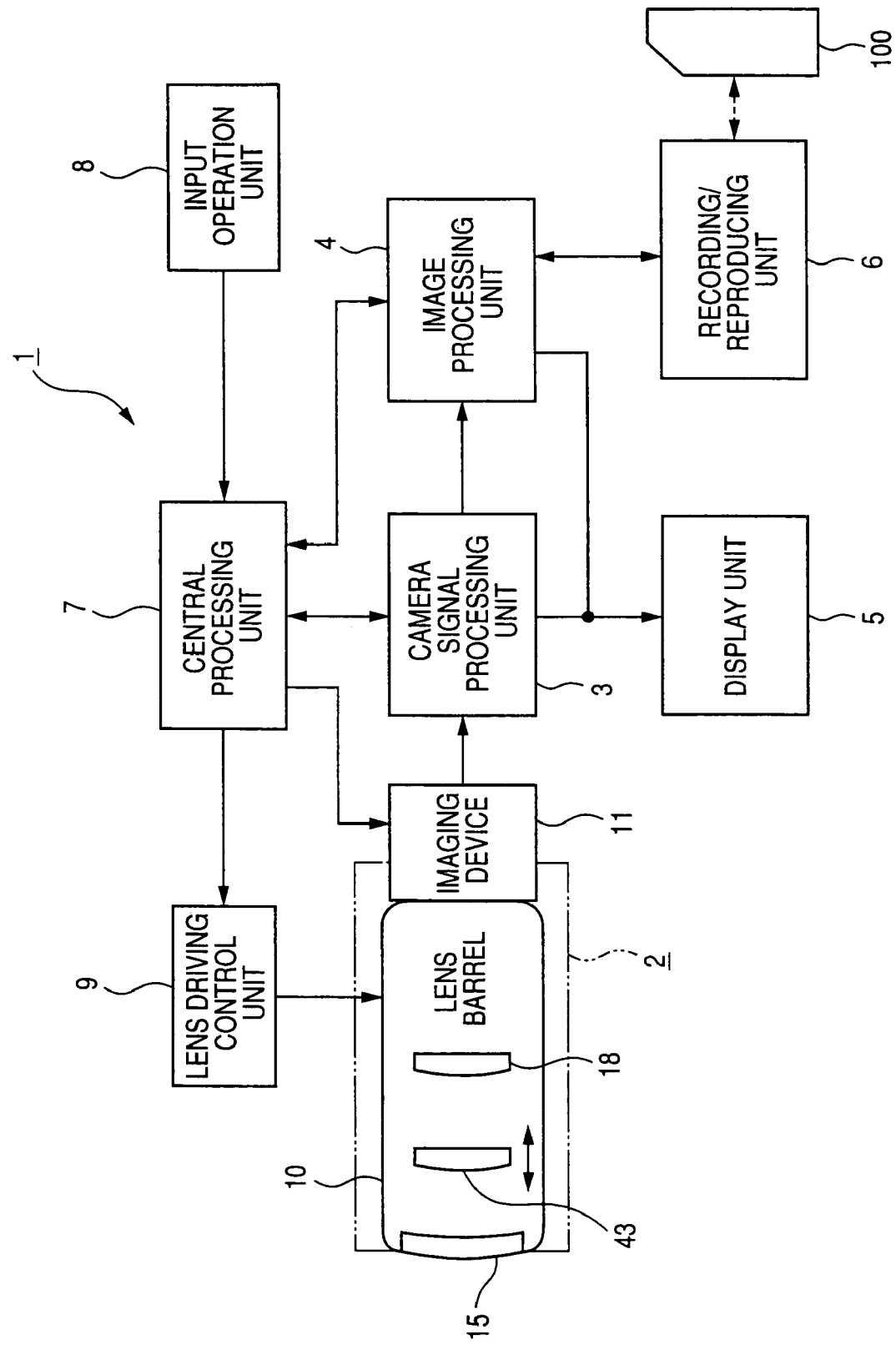
FIG. 1 is a conceptual diagram showing a basic constitution of an image pickup apparatus.

As shown in FIG. 1, an image pickup apparatus 1 (a digital video camera) includes a camera block 2 having an imaging function, a camera signal processing unit 3 that performs signal processing such as analog/digital conversion for an image signal of a photographed image, an image processing unit 4 that performs recording/reproducing processing for the image signal, a display unit 5 that displays the photographed image and the like, a recording/reproducing unit 6 that records data in and reproduces data from a recording medium 100, a central processing unit 7 that controls the entire image pickup apparatus 1, an input operation unit 8 with which a user performs operation input, and a lens driving control unit 9 that controls driving for various lenses of the camera block 2.

The camera block 2 includes a lens barrel 10, an imaging optical system including lenses arranged in the lens barrel 10, and an imaging element 11 such as a Charge Coupled Device (CCD).

The camera signal processing unit 3 performs signal processing such as conversion of an output signal (an analog signal) from the imaging element 11 into a digital signal, noise reduction, image quality correction, and conversion into a luminance signal or a color difference signal.

The image processing unit 4 performs compression coding and expansion decoding processing for an image signal based on a predetermined image data format and conversion processing for data specifications such as resolution.

The recording medium 100 is, for example, a detachable semiconductor memory.

The display unit 5 is, for example, a liquid crystal display.

The recording/reproducing unit 6 writes image data coded by the image processing unit 4 in the recording medium 100 and reads out the image data recorded in the recording medium 100.

The central processing unit 7 is a control processing unit that controls respective circuit blocks provided in the image pickup apparatus 1. The central processing unit 7 controls the respective circuit blocks on the basis of an instruction input signal and the like from the input operation unit 8.

The input operation unit 8 includes a shutter release button for performing a shutter operation and a selection switch for selecting an operation mode. The input operation unit 8 outputs an instruction input signal corresponding to an operation by a user to the central processing unit 7.

The lens driving control unit 9 controls, on the basis of a control signal from the central processing unit 7, a not-shown motor or the like that drives the respective lenses arranged inside the lens barrel 10, for example, a magnification lens for zooming (described later) and a focus lens for focusing (described later).

Operations of the image pickup apparatus 1 will be explained briefly.

In the photographing standby state, under control by the central processing unit 7, an image signal of an image photographed in the camera block 2 is outputted to the display unit 5 via the camera signal processing unit 3 and displayed as a camera-through image.

When an instruction input signal for zooming is inputted from the input operation unit 8, the central processing unit 7 outputs a control signal to the lens driving control unit 9. The magnification lens arranged in the lens barrel 10 is moved on the basis of control of the lens driving control unit 9.

For example, when the shutter release button is half-pressed or is fully-pressed for recording, the lens driving control unit 9 moves the focus lens in the lens barrel 10 on the basis of a control signal from the central processing unit 7, whereby focusing is performed.

When a not-shown shutter of the camera block 2 is operated by an instruction input signal from the input operation unit 8, an image signal is outputted from the camera signal processing unit 3 to the image processing unit 4, subjected to compression coding processing, and converted into digital data of a predetermined data format. The data converted is outputted to the recording/reproducing unit 6 and written in the recording medium 100.

When the image data recorded in the recording medium 100 is reproduced, predetermined image data is read out from the recording medium 100 by the recording/reproducing unit 6 in response to an operation by the input operation unit 8 and subjected to expansion decoding processing in the image processing unit 4. Then, a reproduced image signal is outputted to the display unit 5. Consequently, a reproduced image is displayed.

An example of a constitution of the camera block 2 will be explained.

Required units of the camera block 2 are arranged or supported in the lens barrel 10. Various lenses or a group of lenses (hereinafter simply referred to as "lenses") constituting the imaging optical system are arranged inside the lens barrel 10.

Figure 2:
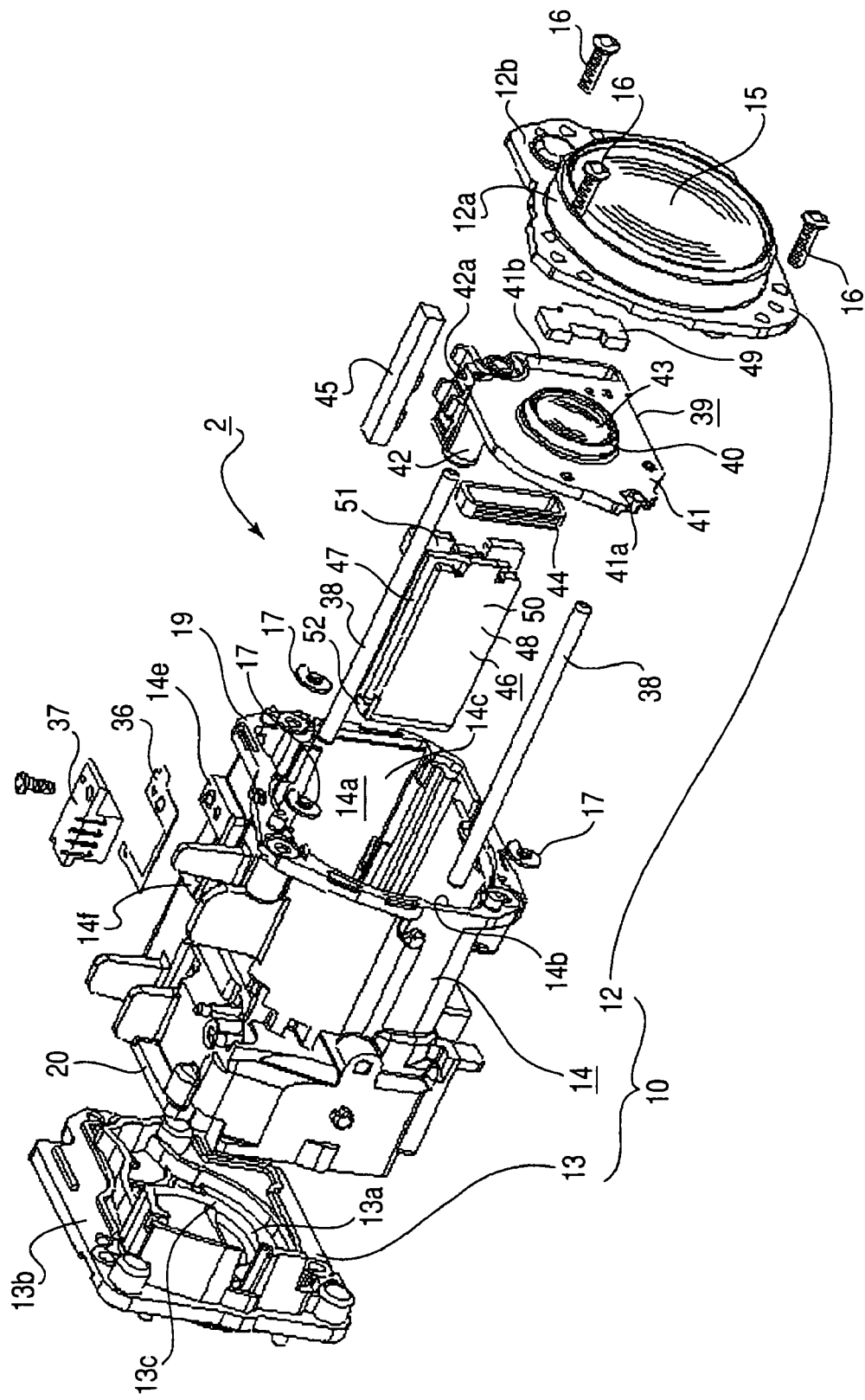
FIG. 2 is a perspective view showing a part of a camera block.

The lens barrel 10 has a front lens barrel 12, a rear lens barrel 13, and an intermediate lens barrel 14 arranged between the front lens barrel 12 and the rear lens barrel 13 (see FIG. 2).

The front lens barrel 12 includes a lens holding section 12a and an attached section 12b stuck out from an outer periphery of the lens holding section 12a. An object lens 15 is held in the lens holding section 12a as a first group lens. The front lens barrel 12 is attached to a front surface of the intermediate lens barrel 14 by attaching screws 16.

The intermediate lens barrel 14 is attached to the front lens barrel 12 by inserting the attaching screws 16, which are inserted through screw inserting holes of the attached section 12a, through spring washers 17, respectively, and screwing the attaching screws 16 in a front surface section of the intermediate lens barrel 14. Therefore, it is possible to change a state of fastening of the attaching screws 16 to the intermediate lens barrel 14 according to the amount of displacement of the spring washers 17. It is possible to adjust the attachment angle of the front lens barrel 12 to the intermediate lens barrel 14 and perform tilt adjustment for the object lens 15 with respect to an optical axis by changing the state of fastening of the attaching screws 16 to the intermediate lens barrel 14.

Two not-shown shaft attaching sections are provided on a rear surface of the front lens barrel 12.

The rear lens barrel 13 includes a cylinder section 13a and an attached section 13b stuck out from an outer periphery of the cylinder section 13a. A light transmitting hole 13c is formed in the cylinder section 13a (see FIG. 2).

Two not-shown shaft attaching sections are provided on a front surface of the rear lens barrel 13.

The rear lens barrel 13 is attached to a rear surface of the intermediate lens barrel 14 by, for example, screwing.

The intermediate lens barrel 14 is formed in a cylindrical shape long in a front-to-rear direction. A lens 18 is held as a third group lens in a position close to a rear end in the inside of the intermediate lens barrel 14 (see FIG. 1). A front side attaching section 19 is provided at a front end of the intermediate lens barrel 14 and a rear side attaching section 20 is provided at a rear end thereof (see FIG. 2). The attached section 12b of the front lens barrel 12 is attached to the front side attaching section 19. The attached section 13b of the rear lens barrel 13 is attached to the rear side attaching section 20.

Figure 3:
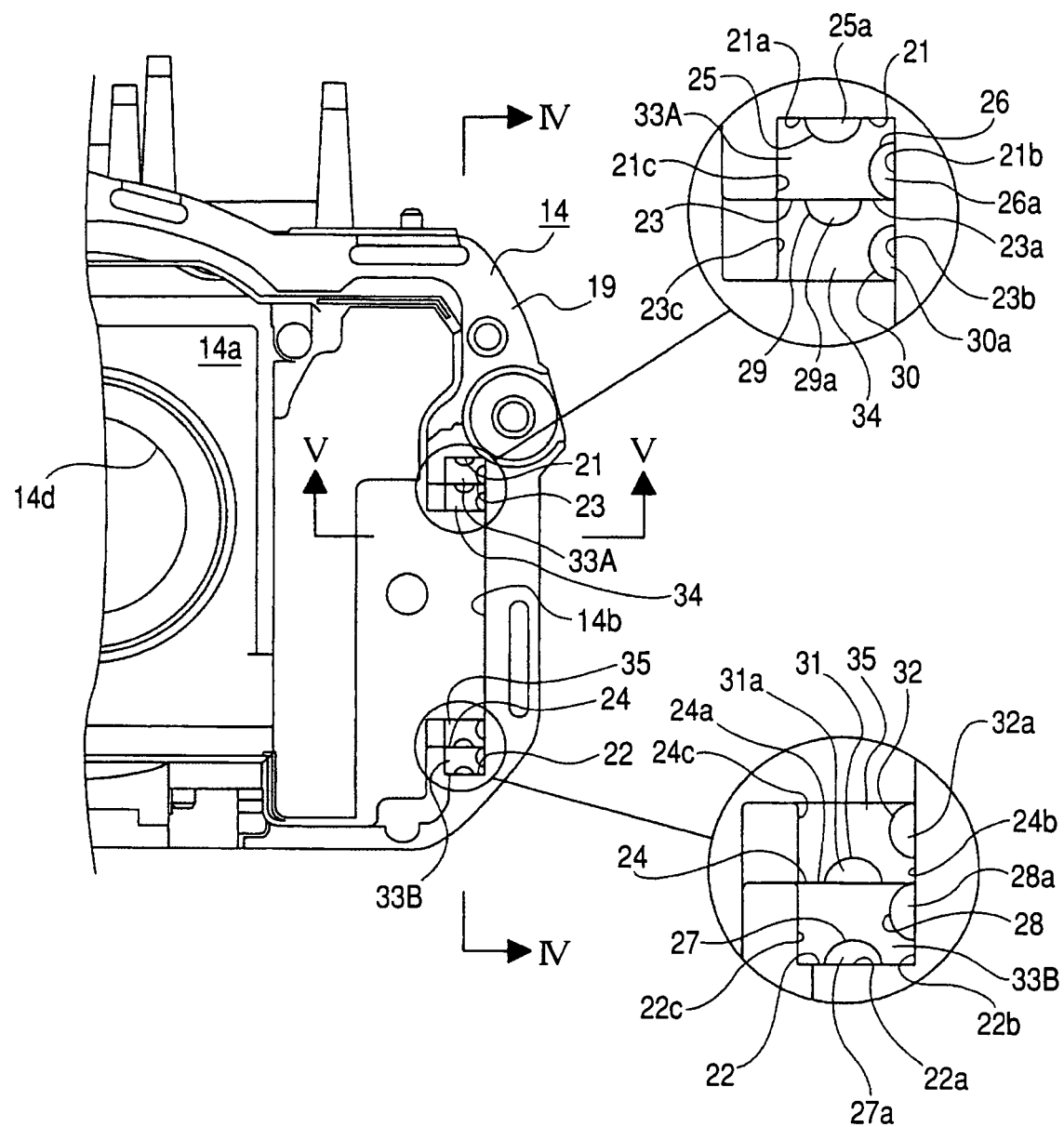
FIG. 3 is an enlarged front view showing a part of an intermediate lens barrel.
Figure 4:
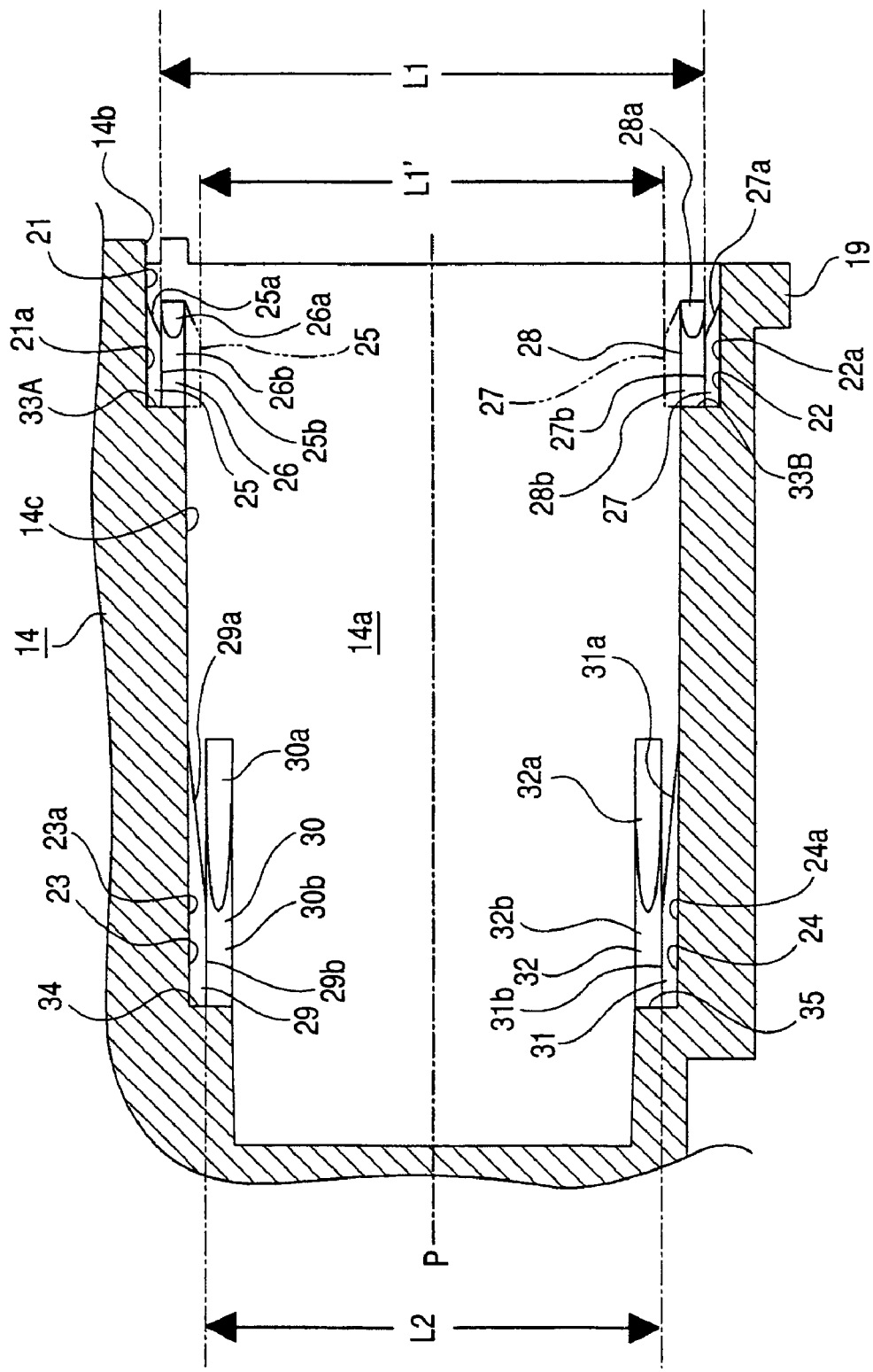
FIG. 4 is a sectional view along line IV-IV in FIG. 3.
Figure 5:
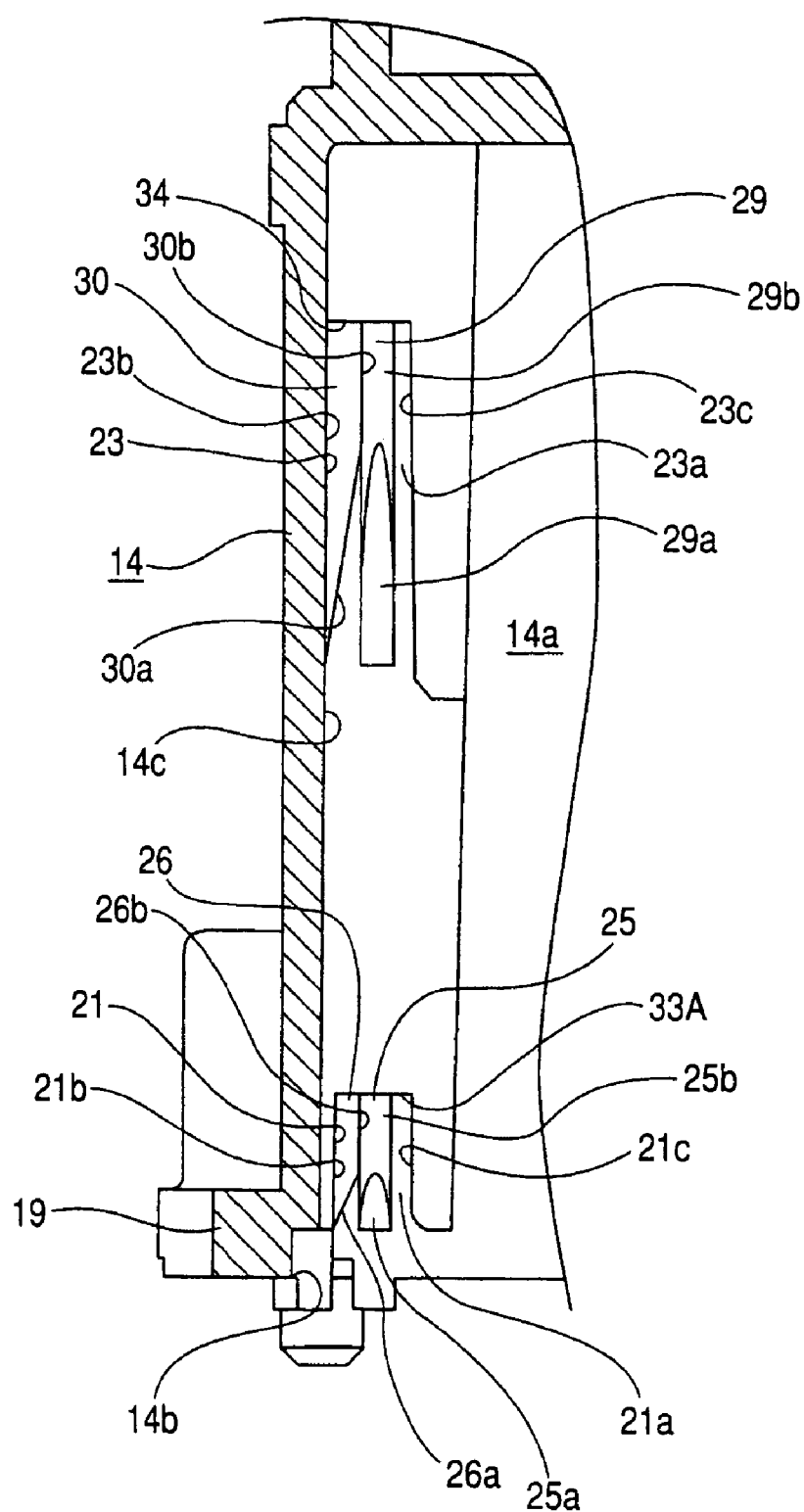
FIG. 5 is a sectional view along line V-V in FIG. 3.

Inside the intermediate lens barrel 14, for example, a pair of first fitting sections 21 and 22 are provided at a front end of a right end thereof and a pair of second fitting sections 23 and 24 are provided in a position close to a rear end of the right end (see FIGS. 3 to 5).

Figure 6:
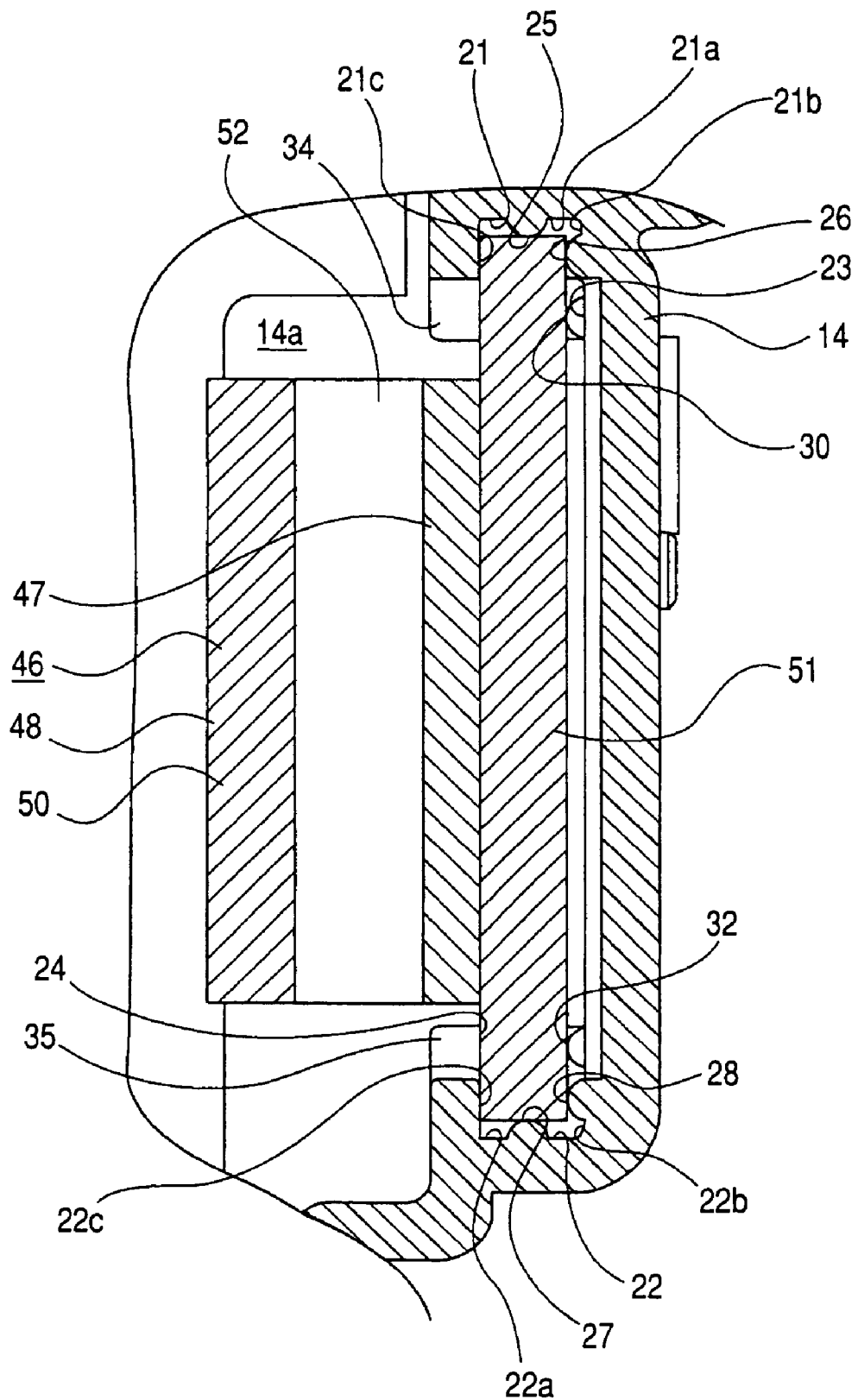
FIG. 6 is an enlarged sectional view showing, with first fitting sections cut, a state in which a yoke is attached to the intermediate lens barrel.

The first fitting section 21 is provided on an upper side and formed in a recessed shape opened downward (see FIG. 6). Therefore, the first fitting section 21 is formed by a top surface 21a facing downward and an outer side surface 21b and an inner side surface 21c continuing to both left and right side edges of the top surface 21a and located to be opposed to each other. A first fitting projection 25 extending in the front to rear direction and projected downward is provided on the top surface 21a. A second fitting projection 26 extending in the front to rear direction and projected to the inner side surface 21c side is provided on the outer side surface 21b.

The first fitting projection 25 and the second fitting projection 26 include guide sections 25a and 26a and press-contact sections 25b and 26b, respectively (see FIG. 4). The guide sections 25a and 26a are formed as tilted sections that are displaced further downward toward the rear thereof. The press-contact sections 25b and 26b continue to rear ends of the guide sections 25a and 26a. Cross sections of the press-contact sections 25b and 26b are formed in substantially a semicircular shape convex downward.

The first fitting section 22 is provided on a lower side and formed in a recessed shape opened upward (see FIG. 6). Therefore, the first fitting section 22 is formed by a bottom surface 22a facing upward and an outer side surface 22b and an inner side surface 22c continuing to both left and right side edges of the bottom surface 22a and located to be opposed to each other. A first fitting projection 27 extending in the front to rear direction and projected upward is provided on the bottom surface 22a. A second fitting projection 28 extending in the front-to-rear direction and projected to the inner side surface 22c side is provided on the outer side surface 22b.

The first fitting projection 27 and the second fitting projection 28 include guide sections 27a and 28a and press-contact sections 27b and 28b, respectively (see FIG. 4). The guide sections 27a and 28a are formed as tilted sections that are displaced further upward toward the rear thereof. The press-contact sections 27b and 28b continue to rear ends of the guide sections 27a and 28a. Cross sections of the press-contact sections 27b and 28b are formed in substantially a semicircular shape convex upward.

Figure 7:
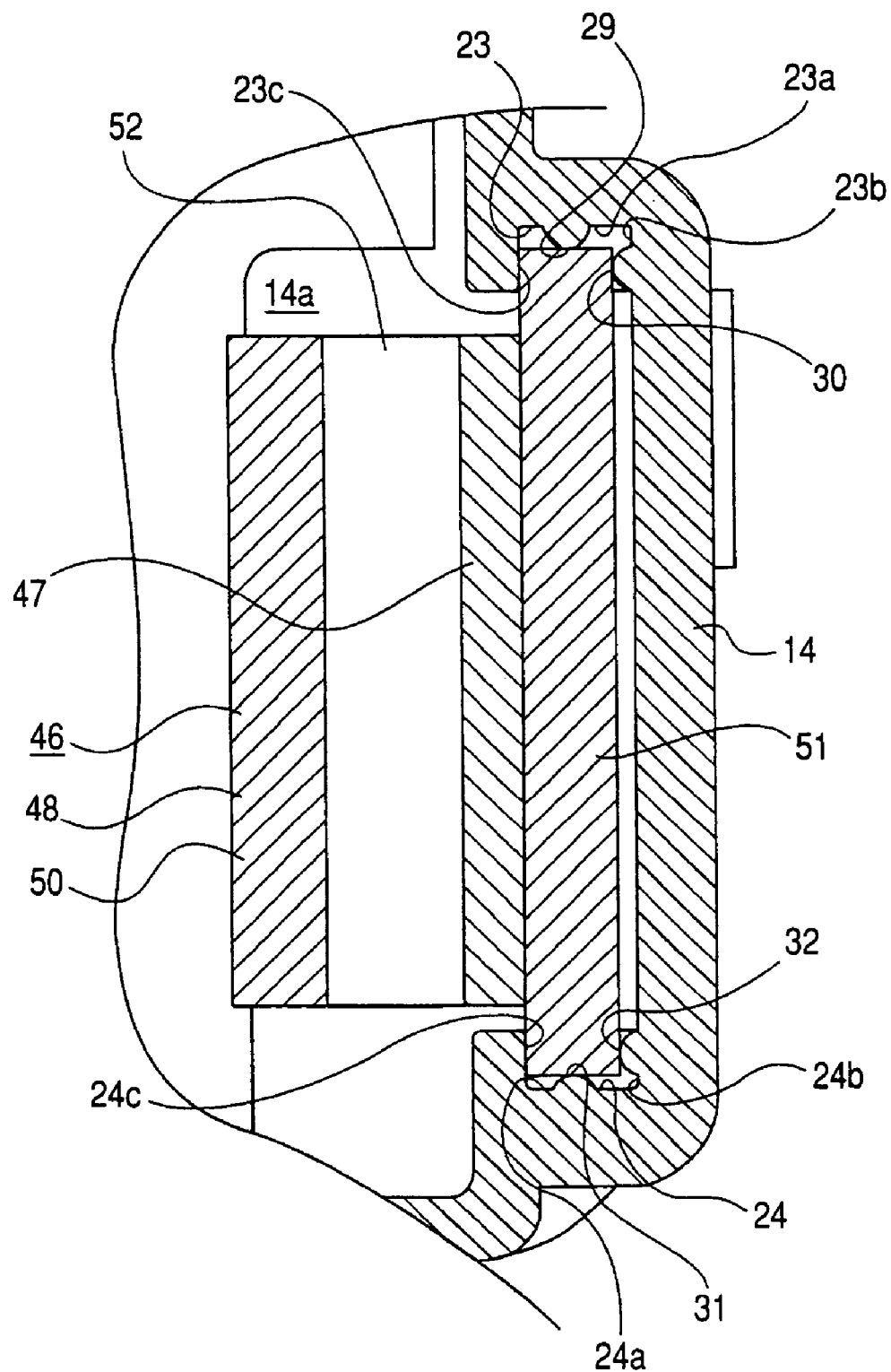
FIG. 7 is an enlarged sectional view showing, with second fitting sections cut, a state in which the yoke is attached to the intermediate lens barrel.

The second fitting section 23 is provided on the upper side and formed in a recessed shape opened downward (see FIG. 7). Therefore, the second fitting section 23 is formed by a top surface 23a facing downward and an outer side surface 23b and an inner side surface 23c continuing to both left and right side edges of the top surface 23a and located to be opposed to each other. A first fitting projection 29 extending in the front to rear direction and projected downward is provided on the top surface 23a. A second fitting projection 30 extending in the front to rear direction and projected to the inner side surface 23c side is provided on the outer side surface 23b.

The first fitting projection 29 and the second fitting projection 30 include guide sections 29a and 30a and press-contact sections 29b and 30b, respectively (see FIG. 4). The guide sections 29a and 30a are formed as tilted sections that are displaced further downward toward the rear thereof. The press-contact sections 29b and 30b continue to rear ends of the guide sections 29a and 30a. Cross sections of the press-contact sections 29b and 30b are formed in substantially a semicircular shape convex downward.

The second fitting section 24 is provided on the lower side and formed in a recessed shape opened upward (see FIG. 7). Therefore, the first fitting section 24 is formed by a bottom surface 24a facing upward and an outer side surface 24b and an inner side surface 24c continuing to both left and right side edges of the bottom surface 24a and located to be opposed to each other. A first fitting projection 31 extending in the front to rear direction and projected upward is provided on the bottom surface 24a. A second fitting projection 32 extending in the front to rear direction and projected to the inner side surface 24c side is provided on the outer side surface 24b.

The first fitting projection 31 and the second fitting projection 32 include guide sections 31a and 31a and press-contact sections 31b and 32b, respectively (see FIG. 4). The guide sections 31a and 32a are formed as tilted sections that are displaced further upward toward the rear thereof. The press-contact sections 31b and 32b continue to rear ends of the guide sections 31a and 32a. Cross sections of the press-contact sections 31b and 32b are formed in substantially a semicircular shape convex upward.

Step surfaces 33A and 33B facing the front are formed at a rear end of the first fitting section 21 and a rear end of the second fitting section 22 (see FIG. 4). Therefore, the first fitting section 21 and the second fitting section 22 are located on front sides of the step surfaces 33A and 33B, respectively.

Step sections facing the front are formed at rear ends of the second fitting sections 23 and 24, respectively. The step sections are formed as butting surfaces 34 and 35 (see FIG. 4). Therefore, the second fitting sections 23 and 24 are located on front sides of the butting surfaces 34 and 35, respectively.

The intermediate lens barrel 14 is formed by injection molding using a resin material. An internal space 14a and an insertion opening 14b located at the front end of the internal lens barrel 14 are formed in the intermediate lens barrel 14 by, after injection cooling of resin, pulling out a mold (not shown) in one direction and releasing the mold. Therefore, in order to secure a satisfactory mold release characteristics at the time when the mold is pulled out, as shown in FIG. 4, an inner peripheral surface 14c of the intermediate lens barrel 14 is gently tilted to be displaced further outward toward the front of the inner peripheral surface 14c. An interval L1 between the press-contact sections 25b and 27b of the first fitting projections 25 and 27 of the first fitting sections 21 and 22 is set larger than an interval L2 between the press-contact sections 29b and 31b of the first fitting projections 29 and 31 of the second fitting sections 23 and 24. The interval L2 between the press-contact sections 29b and 31b includes a part of the length in an up to down direction of the step surfaces 33A and 33B. Length L1' obtained by subtracting the part of the length in the up to down direction of the step surfaces 33A and 33B from L1 is also set larger than L2.

A distance from an optical axis P shown in FIG. 4 to the top surface 21a and the bottom surface 22a of the first fitting sections 21 and 22 is set larger than a distance from the optical axis P to the top surface 23a and the bottom surface 24a of the second fitting sections 23 and 24.

A holding section 14d having a circular opening is provided in a position close to the rear end of the intermediate lens barrel 14 (see FIG. 3). The lens 18 serving as the third group lens is held in the holding section 14d of the intermediate lens barrel 14. A not-shown iris mechanism is arranged on a rear side of the lens 18. A sensor attaching section 14e is provided on an upper surface section of the intermediate lens barrel 14. An arrangement opening 14f communicatively connected to the inside of the intermediate lens barrel 14 is formed in the sensor attaching section 14e (see FIG. 2).

A magnetic sensor 37 is attached to the sensor attaching section 14e of the intermediate lens barrel 14 from an upper side thereof via a sensor attaching plate 36. The magnetic sensor 37 is attached to the sensor attaching section 14e by, for example, screwing. A part of the magnetic sensor 37 is projected to the inside of the intermediate lens barrel 14 from the arrangement opening 14f in a state in which the magnetic sensor 37 is attached to the sensor attaching section 14e (see FIG. 8).

A lens holding frame 39 is supported to move freely in the optical axis direction inside the intermediate lens barrel 14 via the guide shafts 38 (see FIG. 2).

The lens holding frame 39 includes a lens holding section 40, a flange section 41 stuck out from an outer periphery of the lens holding section 40, and a bearing section 42 projected backward from an upper end of the flange section 41. A sliding notch 41a is formed in an outer periphery of the flange section 41. A lengthwise through-hole 41b is formed in a position immediately below the bearing section 42.

A magnification lens 43 for zooming is held in the lens holding section 40 as a second group lens.

A driving coil 44 assuming a lengthwise, substantially-rectangular cylindrical shape is attached in a position surrounding the through-hole 41b on a rear surface of the flange section 41.

A scale attaching section 42a is formed on an upper surface of the bearing section 42. A magnetic scale 45 long in the front to rear direction is attached to the scale attaching section 42a.

Both ends in an axial direction of the guide shafts 38 are attached to a shaft attaching section of the front lens barrel 12 and a shaft attaching section of the rear lens barrel 13, respectively, in a state in which the front lens barrel 12 and the rear lens barrel 13 are attached to the front and the rear of the intermediate lens barrel 14.

The bearing section 42 and the sliding notch 41a of the lens holding frame 39 are supported by the guide shafts 28 to freely slide, respectively. The lens holding frame 39 holding the magnification lens 43 is guided by the guide shafts 38 and made movable in the optical axis direction. In a state in which the lens holding frame 39 is made movable in the optical axis direction in the internal space 14a of the intermediate lens barrel 14, the magnetic scale 45 attached to the bearing section 42 is located to be opposed to the magnetic sensor 37 (see FIG. 8).

A yoke 46 and a magnet 47 are arranged inside the intermediate lens barrel 14.

Figure 8:
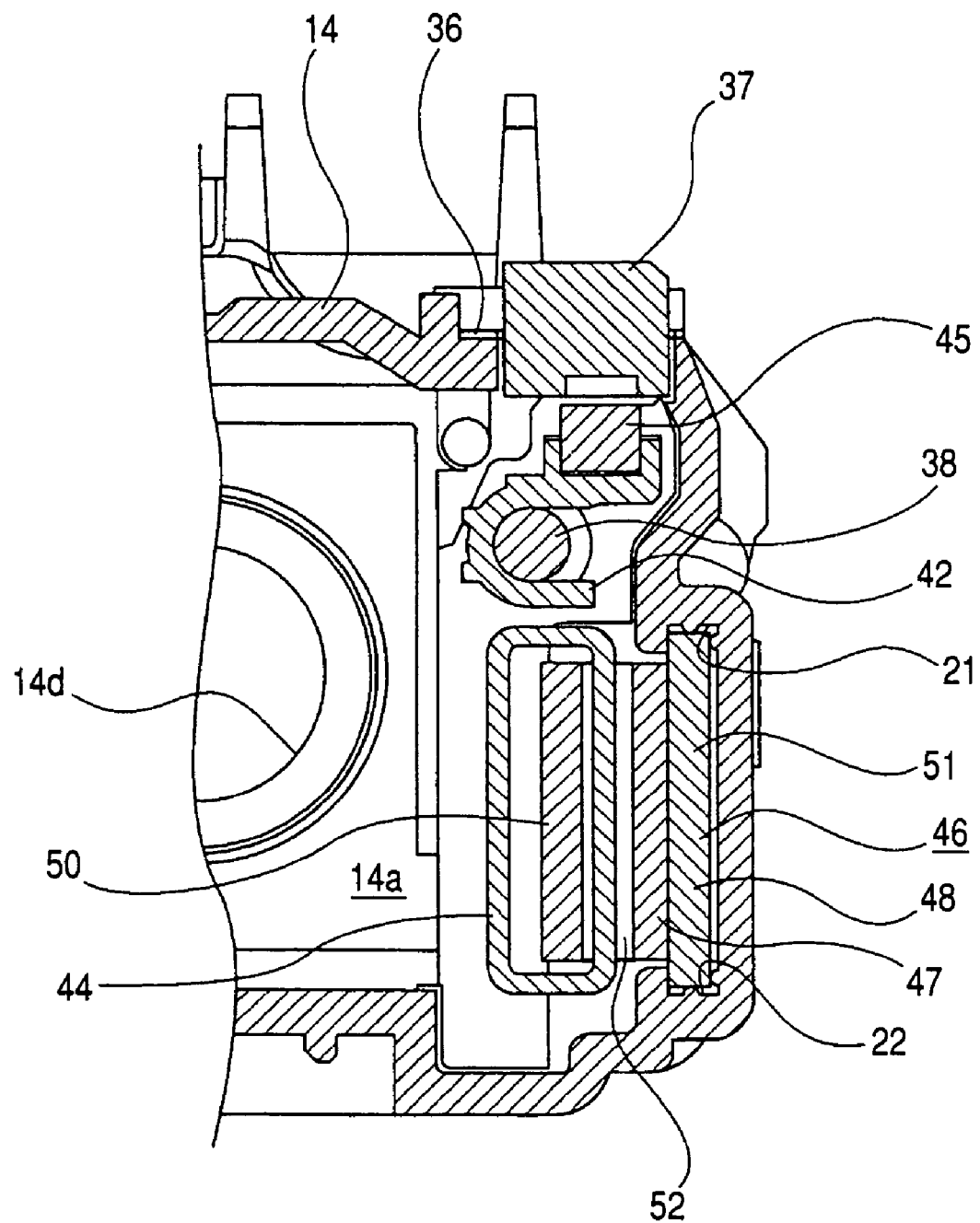
FIG. 8 is a sectional view showing an arrangement state of respective units in the intermediate lens barrel.
Figure 9:
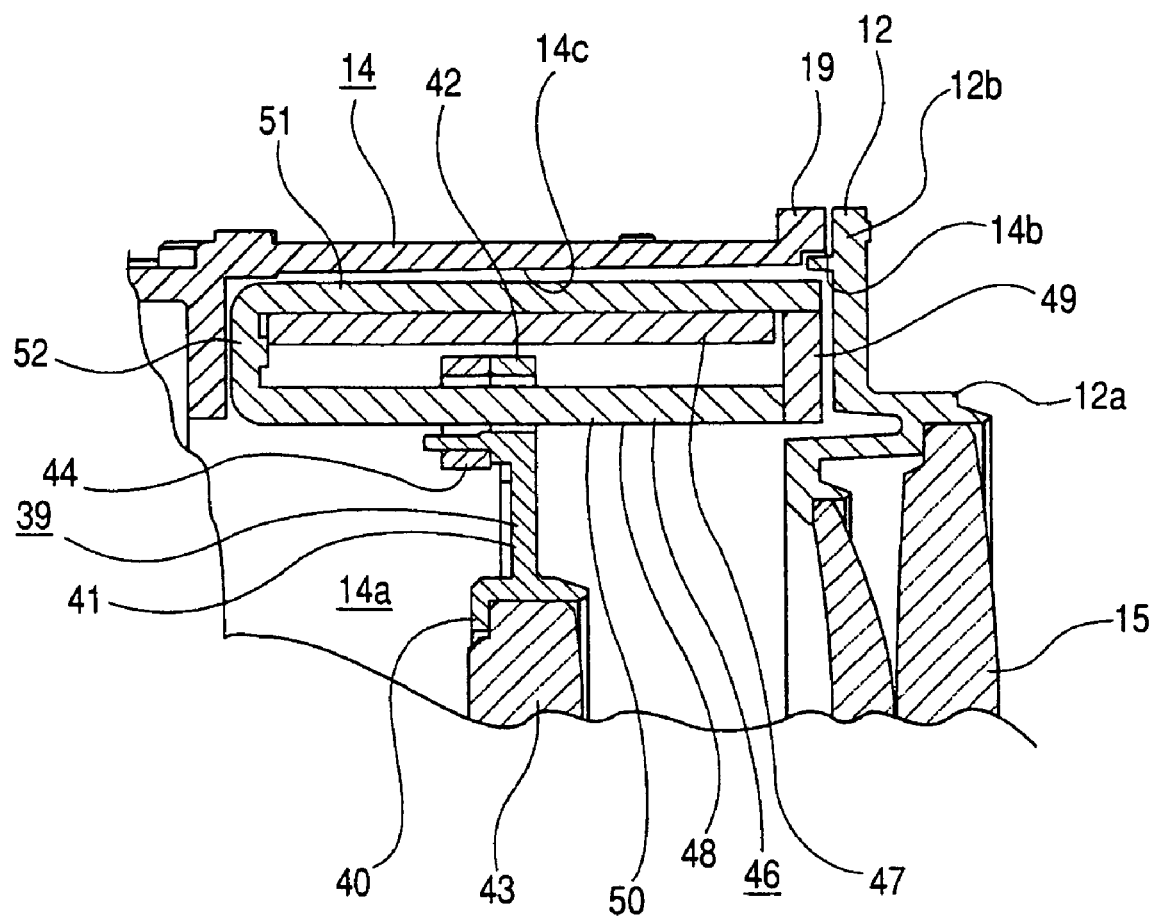
FIG. 9 is a sectional view showing the arrangement state of respective units in the intermediate lens barrel cut in a position different from that shown in FIG. 8.

As shown in FIGS. 2, 8, and 9, the yoke 46 includes a yoke body 48 formed in a U shape opened to the front when viewed in a horizontal sectional shape and a yoke bridge 49 that closes the opening in front of the yoke body 48. The yoke bridge 49 is attached to a front end of the yoke body 48. The yoke body 48 includes an inner surface section 50 and an outer surface section 51, which are located to be opposed to each other long in the front to rear direction, and a rear section 52 that couples a rear end of the inner surface section 50 and a rear end of the outer surface section 51.

Figure 10:
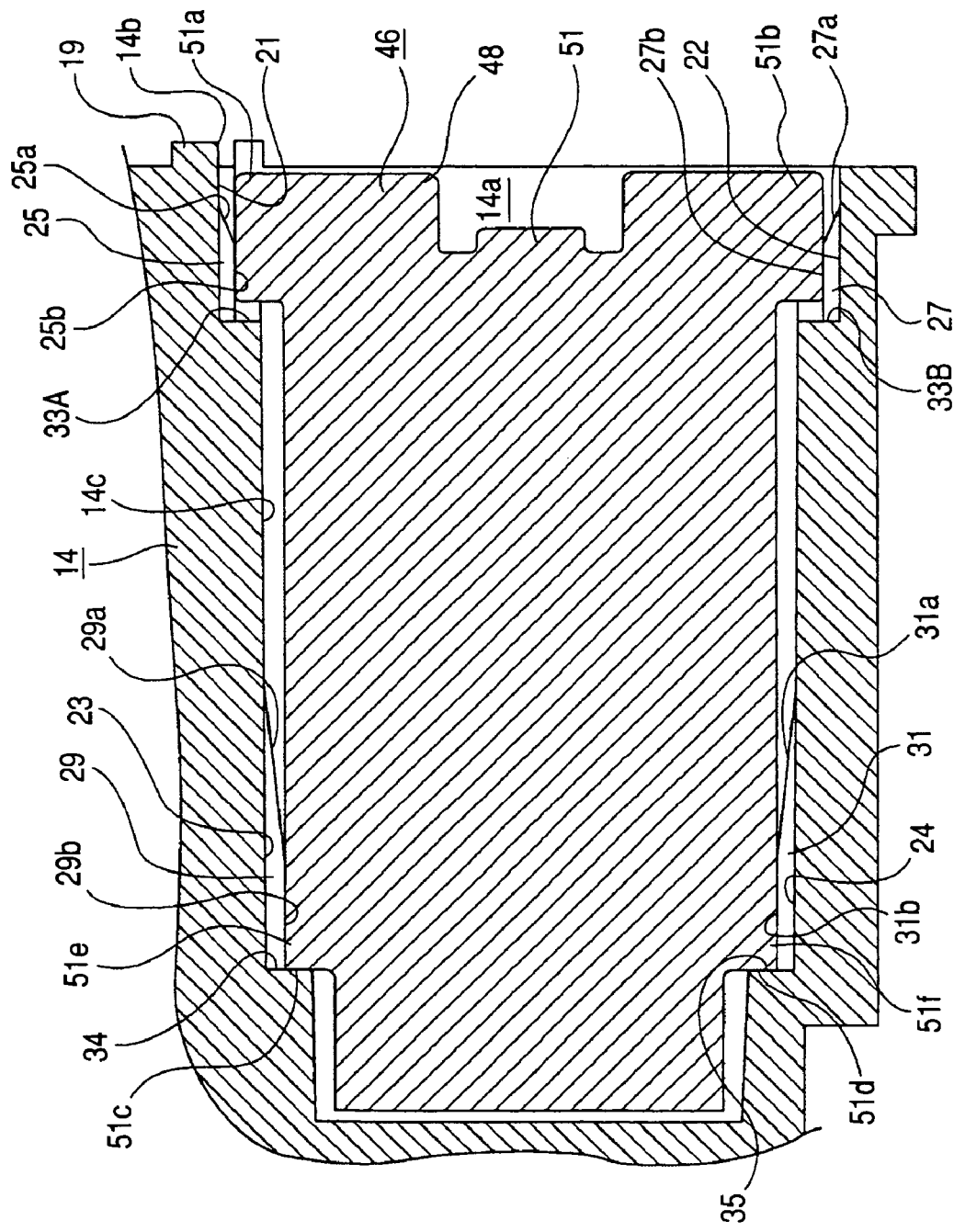
FIG. 10 is a sectional view showing a state in which the yoke is attached to the intermediate lens barrel in a cut position the same as that shown in FIG. 4.

Fitting projections 51a and 51b projected upward and downward, respectively, are provided at a front end of the outer surface section 51 of the yoke body 48 (see FIG. 10). An amount of upward projection of the fitting projection 51a is set larger than an amount of downward projection of the fitting projection 51b.

Regulation surfaces 51c and 51d facing backward are formed at both upper and lower ends in a position close to a rear end of the outer surface section 51 of the yoke body 48. A width in the up-to-down direction of the outer surface section 51 from a rear end of the fitting projection 51a to the regulation surfaces 51c and 51d is fixed. Portions immediately in front of the regulation surfaces 51c and 51d of the yoke body 48 are provided as press-fit sections 51e and 51f, respectively.

The magnet 47 is formed in a tabular shape long in the front-to-rear direction and attached to an inner surface of the outer surface section 51 of the yoke body 48.

The yoke 46 attached with the magnet 47 is inserted into the internal space 14a from the insertion opening 14b of the intermediate lens barrel 14 and attached to the intermediate lens barrel 14 in a fitted state.

Immediately after the start when the yoke 46 is inserted into the internal space 14a from the insertion opening 14b, as described above, the interval L1 between the press-contact sections 25b and 27b of the first fitting projections 25 and 27 of the first fitting sections 21 and 22 is set larger than the interval L2 between the press-contact sections 29b and 31b of the first fitting projections 29 and 31 of the second fitting sections 23 and 24. Thus, the outer surface section 51 does not come into contact with the first fitting sections 21 and 22. Therefore, it is possible to smoothly insert the yoke 46 into the intermediate lens barrel 14.

When the yoke 46 is inserted into the internal space 14a from the insertion opening 14b, both upper and lower surfaces of the press-fit sections 51e and 51f of the outer surface section 51 are guided by guide sections 29a, 31a, 30a, and 32a of the first fitting projections 29 and 31 and the second fitting projections 30 and 32 provided in the second fitting sections 23 and 24, respectively. The press-fit sections 51e and 51f are inserted into the second fitting sections 23 and 24, respectively.

At the same time, both upper and lower surfaces of the fitting projections 51a and 51b of the outer surface section 51 are guided by guide sections 25a, 27a, 26a, and 28a of the first fitting projections 25 and 27 and the second fitting projections 26 and 28 provided in the first fitting sections 21 and 22, respectively. The fitting projections 51a and 51b are inserted into the first fitting sections 21 and 22, respectively.

The yoke 46 is inserted to a position where the regulation surfaces 51c and 51d come into contact with the butting surfaces 34 and 35, respectively (see FIG. 10).

As described above, the press-fit sections 51e and 51f are inserted into the second fitting sections 23 and 24, respectively. Consequently, as shown in FIG. 7, the press-fit section 51e is pressed by the press-contact section 29b of the first fitting projection 29, the press-contact section 30b of the second fitting projection 30, and the inner side surface 23c of the second fitting section 23 and fit in. The press-fit section 51f is pressed by the press-contact section 31b of the first fitting projection 31, the press-contact section 32b of the second fitting projection 32, and the inner side 24c of the second fitting section 24 and fit in.

The fitting projections 51a and 51b are inserted into the first fitting sections 21 and 22, respectively. Consequently, as shown in FIG. 6, the fitting projection 51a is pressed by the press-contact section 25b of the first fitting projection 25, the press-contact section 26b of the second fitting projection 26, and the inner side surface 21c of the first fitting section 21 and fit in. The fitting projection 51b is pressed by the press-contact section 27b of the first fitting projection 27, the press-contact section 28b of the second fitting projection 28, and the inner side 22c of the first fitting section 22 and fit in.

As described above, the press-fit sections 51e and 51f are fit in the second fitting sections 23 and 24, respectively, and the fitting projections 51a and 51b are fit in the first fitting sections 21 and 22, respectively. Consequently, the yoke 46 attached with the magnet 47 is fixed inside the intermediate lens barrel 14. As shown in FIG. 8, the yoke bridge 49 is attached to the yoke body 48 of the yoke 46 in a state in which the inner surface section 50 of the yoke body 48 is inserted through the through-hole 41b of the lens holding frame 39 and the driving coil 44.

A not-shown holding frame that holds a movable lens functioning as a focus lens is supported at rear end sides of the guide shafts 38 to move freely in the optical axis direction.

The imaging element 11 is arranged at a rear end of the rear side lens barrel 13.

In the image pickup apparatus 1 constituted as described above, when a driving current is supplied to the driving coil 44, in a relation between a direction of the current supplied and a magnetic pole of the magnet 47, propulsion corresponding to the direction of the current is given to the lens holding frame 39. The lens holding frame 39 is guided by the guide shafts 38, and the magnification lens 43 is moved in the optical axis direction. Consequently, a zoom function is displayed. At this point, a position of the magnification lens 43 in the optical direction is detected by the magnetic sensor 37 opposed to the magnetic scale 45 attached to the lens holding frame 39.

As described above, in the image pickup apparatus 1, the first fitting sections 21 and 22 and the second fitting sections 23 and 24 are provided so as to be spaced apart in the inserting direction of the yoke 46 into the intermediate lens barrel 14.

Therefore, the yoke 46 is attached to the inside of the intermediate lens barrel 14 in a fitted state by the first fitting sections 21 and 22 and the second fitting sections 23 and 24 that are sections spaced apart in the inserting direction. Thus, it is possible to prevent a backlash of the yoke 46 with respect to the intermediate lens barrel 14 and secure a high impact resistance.

Since the yoke 46 is held by only the single intermediate lens barrel 14, tilt adjustment for the object lens 15 with respect to the optical axis, which is performed by adjusting the attachment angle of the front lens barrel 12 with respect to the intermediate lens barrel 14, is not hindered.

Moreover, since the yoke 46 is inserted from the insertion opening 14b of the intermediate lens barrel 14 and attached to the inside of the intermediate lens barrel 14, it is unnecessary to form an opening used exclusively for attaching the yoke 46 other than the insertion opening 14b for inserting the guide shafts 38 and the lens holding frame 39 into the intermediate lens barrel 14. Therefore, an opening area of the lens barrel 14 is small, and it is possible to reduce the amount of dust entering the inside of the lens barrel 14.

In the intermediate lens barrel 14, the interval L1 between the press-contact sections 25b and 27b of the first fitting projections 25 and 27 of the first fitting sections 21 and 22 is set larger than the interval L2 between the press-contact sections 29b and 31b of the first fitting projections 29 and 31 of the second fitting sections 23 and 24. The distance from the optical axis P to the top surface 21a and the bottom surface 22a of the first fitting sections 21 and 22 is set larger than the distance from the optical axis P to the top surface 23a and the bottom surface 24a of the second fitting sections 23 and 24. Thus, it is possible to improve the mold release characteristics of a mold when the intermediate lens barrel 14 is formed by pulling out the mold in one direction (a direction opposite of the inserting direction) and releasing the mold.

The step surface 33A is formed between the first fitting section 21 and the second fitting section 23 of the intermediate lens barrel 14, and the step surface 33B is formed between the first fitting section 22 and the second fitting section 24. Thus, immediately after starting the insertion of the yoke 46 into the intermediate lens barrel 14, the yoke 46 does not come into contact with the first fitting sections 21 and 22. It is possible to arbitrarily set left and right groove widths of the first fitting sections 21 and 22 and the second fitting sections 23 and 24 and realize an improvement of the degree of freedom of design of the lens barrel 14. For example, a groove width of the first fitting sections 21 and 22 and a groove width of the second fitting sections 23 and 24 may be set the same or may be set different. When the groove width of the first fitting sections 21 and 22 and the groove width of the second fitting sections 23 and 24 are set differently, it may be necessary to set the thickness of the outer side surface 51 of the yoke 46 according to the groove widths.

Moreover, since the fitting projections 51a and 51b are provided in the yoke 46, even when the step surfaces 33A and 33B are formed in the intermediate lens barrel 14 as described above, it is possible to secure a satisfactory fitted state of the yoke 46 in the first fitting sections 21 and 22 without complicating the shape of the yoke 46.

Furthermore, when the magnification lens 43 for zooming described above is used as a movable lens, in general, since the moving distance of the magnification lens 43 becomes longer, it may be necessary to increase the length of the yoke 46 as well. However, since the long yoke 46 for movement of the magnification lens 43 is held by the first fitting sections 21 and 22 and the second fitting sections 23 and 24 provided to be spaced apart in the inserting direction as described above, it is possible to prevent a backlash of the yoke 46 with respect to the intermediate lens barrel 14.

An image pickup apparatus according to an embodiment of the invention includes a lens barrel, a lens holding frame made movable in an optical axis direction inside the lens barrel, a movable lens held in the lens holding frame, a yoke inserted into the lens barrel from one side in the optical axis direction and attached to the lens barrel in a fitted state, a magnet attached to the yoke, and a driving coil that is attached to the lens holding frame and located to be opposed to the magnet at least in a part thereof and gives propulsion in a direction corresponding to a direction of a supplied driving current to the lens holding frame. A pair of first fitting sections that are spaced apart in the optical axis direction and a direction orthogonal to a thickness direction of the yoke and fit the yoke therein is provided in the lens barrel. A pair of second fitting sections that are spaced apart in the optical axis direction and the direction orthogonal to the thickness direction of the yoke and fit the yoke therein is provided in the lens barrel further on a side of the direction of insertion of the yoke into the lens barrel than the first fitting sections. An interval between the first fitting sections is set larger than an interval between the second fitting sections. A distance from the optical axis to the respective first fitting sections is set larger than a distance from the optical axis to the respective second fitting sections.

Therefore, the yoke is attached to the inside of the lens barrel in a fitted state by the first fitting sections and the second fitting sections that are sections spaced apart in an inserting direction of the yoke. Thus, it is possible to prevent a backlash of the yoke with respect to the lens barrel in an attached state and secure a high impact resistance.

Since the yoke is held by only the single lens barrel, tilt adjustment for a lens with respect to an optical axis is not hindered.

Moreover, the yoke is inserted into the lens barrel from one side and attached to the inside of the lens barrel. Thus, it is unnecessary to form an opening used exclusively for attaching the yoke. Therefore, an opening area of the lens barrel is small, and it is possible to reduce the amount of dust entering the inside of the lens barrel.

Furthermore, a distance from an optical axis to the first fitting sections is set larger than a distance from the optical axis to the second fitting sections. Thus, it is possible to realize an improvement of the mold release characteristics of a mold when the lens barrel is formed by pulling out the mold in one direction and releasing the mold.

In another embodiment of the invention, a step surface for setting an interval between the first fitting sections larger than an interval between the second fitting sections is formed between the first fitting sections and the second fitting sections of the lens barrel. Thus, immediately after starting the insertion of the yoke into the lens barrel, the yoke does not come into contact with the first fitting sections. It is possible to set the widths of the first fitting sections and the second fitting sections arbitrarily and realize an improvement of the degree of freedom of design of the lens barrel.

In still another embodiment of the invention, fitting projections projected in a direction orthogonal to both the thickness direction and the inserting direction of the yoke are provided at an end on the opposite side of the inserting direction of the yoke. Thus, even when the step surface is formed in the lens barrel, it is possible to secure a satisfactory fitted state of the yoke in the first fitting sections without complicating the shape of the yoke.

In still another embodiment of the invention, a magnification lens for zooming is used as the movable lens. Thus, even when a moving distance of the magnification lens is increased and the length of the yoke is increased, it is possible to prevent a backlash of the yoke with respect to an intermediate lens barrel.

A lens barrel according to still another embodiment of the invention is a lens barrel in which a yoke attached with a magnet is inserted from one side in an optical axis direction and attached in a fitted state and a lens holding frame that holds a movable lens in the inside thereof is made movable in the optical axis direction. The lens barrel includes a pair of first fitting sections that are spaced apart in the optical axis direction and a direction orthogonal to a thickness direction of the yoke and fit the yoke therein and a pair of second fitting sections that are spaced apart in the optical axis direction and the direction orthogonal to the thickness direction of the yoke and fit the yoke therein further on a side of the direction of insertion of the yoke into the lens barrel than the first fitting sections. An interval between the first fitting sections is set larger than an interval between the second fitting sections. A distance from the optical axis to the respective first fitting sections is set larger than a distance from the optical axis to the respective second fitting sections.

Therefore, the yoke is attached to the inside of the lens barrel in a fitted state by the first fitting sections and the second fitting sections that are sections spaced apart in the inserting direction of the yoke. Thus, it is possible to prevent a backlash of the yoke with respect to the lens barrel in an attached state and secure high impact resistance.

Since the yoke is held by only the single lens barrel, tilt adjustment for a lens with respect to an optical axis is not hindered.

Moreover, the yoke is inserted into the lens barrel from one side and attached to the inside of the lens barrel. Thus, it is unnecessary to form an opening used exclusively for attaching the yoke in the lens barrel. Therefore, an opening area of the lens barrel is small, and it is possible to reduce the amount of dust entering the inside of the lens barrel.

Furthermore, a distance from an optical axis to the first fitting sections is set larger than a distance from the optical axis to the second fitting sections. Thus, it is possible to realize an improvement of the mold release characteristics of a mold when the lens barrel is formed by pulling out the mold in one direction and releasing the mold.

In still another embodiment of the invention, a step surface for setting an interval between the first fitting sections larger than an interval between the second fitting sections is formed between the first fitting sections and the second fitting sections of the lens barrel. Thus, immediately after starting insertion of the yoke into the lens barrel, the yoke does not come into contact with the first fitting sections. Further, it is possible to arbitrarily set widths of the first fitting sections and the second fitting sections and realize an improvement of the degree of freedom of design of the lens barrel.

In still another embodiment of the invention, the movable lens used as a zooming lens is made movable in an optical axis direction in the inside. Thus, even when a moving direction of the magnification lens increases and the length of the yoke is increased, it is possible to prevent a backlash of the yoke with respect to an intermediate lens barrel.

The up-to-down direction, the front-to-rear direction, and the left-to-right direction described above are only for the convenience of explanation. Directions are not limited to these directions.

Specific shapes and structures of the respective units in the embodiment are described as only examples of embodiments. Thus, the technical scope of the invention should not be interpreted limitedly because of the shapes and the structures.

It should be understood by those skilled in the art that various modifications, combinations, subcombinations, and alterations may occur depending on design requirements and other factors insofar as they are within the scope of the appended claims or the equivalent thereof.

What is claimed is:

1. An image pickup apparatus comprising:
    a lens barrel;
    a lens holding frame made movable in an optical axis direction inside the lens barrel;
    a movable lens held in the lens holding frame;
    a yoke inserted into the lens barrel from one side in the optical axis direction and attached to the lens barrel in a fitted state;
    a magnet attached to the yoke; and
    a driving coil that is attached to the lens holding frame and located to be opposed to the magnet at least in a part thereof and gives propulsion in a direction corresponding to a direction of a supplied driving current to the lens holding frame,
    wherein a pair of first fitting sections that are spaced apart in the optical axis direction and a direction orthogonal to a thickness direction of the yoke and fit the yoke therein is provided in the lens barrel,
    a pair of second fitting sections that are spaced apart in the optical axis direction and the direction orthogonal to the thickness direction of the yoke and fit the yoke therein is provided in the lens barrel further on a side of a direction of insertion of the yoke into the lens barrel than the first fitting sections,
    an interval between the first fitting sections is set larger than an interval between the second fitting sections, and
    a distance from the optical axis to the respective first fitting sections is set larger than a distance from the optical axis to the respective second fitting sections.

2. An image pickup apparatus according to claim 1, wherein a step surface for setting an interval between the first fitting sections larger than an interval between the second fitting sections is formed between the first fitting sections and the second fitting sections of the lens barrel.

3. An image pickup apparatus according to claim 2, wherein fitting projections projected in a direction orthogonal to both the thickness direction and the inserting direction of the yoke are provided at an end on an opposite side of the inserting direction of the yoke.

4. An image pickup apparatus according to claim 1, wherein a magnification lens for zooming is used as the movable lens.

5. A lens barrel in which a yoke attached with a magnet is inserted from one side in an optical axis direction and attached in a fitted state and a lens holding frame that holds a movable lens in the inside thereof is made movable in the optical axis direction, the lens barrel comprising:
    a pair of first fitting sections that are spaced apart in an optical axis direction and a direction orthogonal to a thickness direction of the yoke and fit the yoke therein; and
    a pair of second fitting sections that are spaced apart in the optical axis direction and the direction orthogonal to the thickness direction of the yoke and fit the yoke therein further on a side of a direction of insertion of the yoke into the lens barrel than the first fitting sections,
    wherein an interval between the first fitting sections is set larger than an interval between the second fitting sections, and
    a distance from the optical axis to the respective first fitting sections is set larger than a distance from the optical axis to the respective second fitting sections.

6. A lens barrel according to claim 5, wherein a step surface for setting an interval between the first fitting sections larger than an interval between the second fitting sections is formed between the first fitting sections and the second fitting sections of the lens barrel.

7. A lens barrel according to claim 5, wherein the movable lens used as a zooming lens is made movable in an optical axis direction in the inside.

* * * * *